United States Patent
Kwon et al.

(10) Patent No.: US 10,302,176 B2
(45) Date of Patent: May 28, 2019

(54) PLANETARY GEAR TRAIN OF AUTOMATIC TRANSMISSION FOR VEHICLE

(71) Applicants: HYUNDAI MOTOR COMPANY, Seoul (KR); KIA Motors Corporation, Seoul (KR)

(72) Inventors: Hyun Sik Kwon, Seoul (KR); Seong Wook Hwang, Gunpo-si (KR); Ki Tae Kim, Incheon (KR); Wonmin Cho, Hwaseong-si (KR); Jae Chang Kook, Hwaseong-si (KR); Seongwook Ji, Gunpo-si (KR)

(73) Assignees: HYUNDAI MOTOR COMPANY, Seoul (KR); KIA Motors Corporation, Seoul (KR)

( * ) Notice: Subject to any disclaimer, the term of this patent is extended or adjusted under 35 U.S.C. 154(b) by 53 days.

(21) Appl. No.: 15/829,229

(22) Filed: Dec. 1, 2017

(65) Prior Publication Data
US 2019/0085952 A1    Mar. 21, 2019

(30) Foreign Application Priority Data
Sep. 20, 2017  (KR) .................. 10-2017-0121435

(51) Int. Cl.
*F16H 3/66* (2006.01)
(52) U.S. Cl.
CPC ..... *F16H 3/663* (2013.01); *F16H 2200/0065* (2013.01); *F16H 2200/2012* (2013.01); *F16H 2200/2023* (2013.01); *F16H 2200/2025* (2013.01); *F16H 2200/2046* (2013.01)

(58) Field of Classification Search
None
See application file for complete search history.

(56) References Cited

U.S. PATENT DOCUMENTS

| | | | | |
|---|---|---|---|---|
| 5,133,697 A | * | 7/1992 | Hattori | F16H 3/663 475/276 |
| 6,884,197 B2 | * | 4/2005 | Ishimaru | F16H 3/66 475/271 |
| 6,905,434 B2 | * | 6/2005 | Sugihara | F16H 3/663 475/276 |

(Continued)

*Primary Examiner* — Dirk Wright
(74) *Attorney, Agent, or Firm* — McDonnell Boehnen Hulbert & Berghoff LLP (57) ABSTRACT

A planetary gear train of an automatic transmission may include: an input shaft receiving torque of an engine; an output shaft transmitting torque to an output gear; a first planetary gear set including first, second, and third rotation elements; a compound planetary gear set including fourth, fifth, sixth, and seventh rotation elements; a fourth planetary gear set including eighth, ninth, and tenth rotation elements; a first shaft fixedly connected to the ninth rotation element and the input shaft; a second shaft fixedly connected to the second and sixth rotation elements and fixedly connected to the output shaft; a third shaft fixedly connected to the first and tenth rotation elements; a fourth shaft fixedly connected to the fourth rotation element; a fifth shaft fixedly connected to the fifth rotation element; a sixth shaft fixedly connected to the seventh rotation element; and a plurality of shafts selectively connected to a transmission housing.

17 Claims, 4 Drawing Sheets

(56) References Cited

U.S. PATENT DOCUMENTS

| | | | |
|---|---|---|---|
| 7,553,253 B2* | 6/2009 | Kamada | F16H 3/66 475/276 |
| 7,582,039 B2* | 9/2009 | Iwasaki | F16H 3/66 475/280 |
| 7,749,128 B2* | 7/2010 | Kamada | F16H 3/66 475/280 |

* cited by examiner

| Speed stage | Engaging element | | | | | | Gear ratio |
|---|---|---|---|---|---|---|---|
| | C1 | C2 | C3 | C4 | B1 | B2 | |
| D1 |  | ● |  | ● | ● |  | 5.697 |
| D2 |  | ● |  |  | ● | ● | 4.733 |
| D3 |  | ● |  | ● |  | ● | 4.544 |
| D4 |  |  | ● | ● |  | ● | 4.200 |
| D5 |  | ● | ● |  |  | ● | 3.918 |
| D6 | ● |  | ● |  |  | ● | 3.400 |
| D7 | ● | ● |  |  |  | ● | 1.846 |
| D8 | ● | ● |  | ● |  |  | 1.000 |
| D9 | ● | ● |  |  | ● |  | 0.880 |
| REV |  | ● | ● |  | ● |  | -2.448 |

FIG. 3

FIG. 4

PLANETARY GEAR TRAIN OF AUTOMATIC TRANSMISSION FOR VEHICLE

CROSS-REFERENCE TO RELATED APPLICATION

This application claims priority to and the benefit of Korean Patent Application No. 10-2017-0121435 filed in the Korean Intellectual Property Office on Sep. 20, 2017, the entire contents of which are incorporated herein by reference.

BACKGROUND OF THE DISCLOSURE

(a) Field of the Disclosure

The present disclosure relates to an automatic transmission for a vehicle. More particularly, the present disclosure relates to a planetary gear train of an automatic transmission for a vehicle that may improve power delivery performance and fuel consumption by achieving at least nine forward speed stages using minimum number of constituent elements, and may improve silent driving with little to no noise by using a driving point positioned at a low engine speed.

(b) Description of the Related Art

Recently, increasing oil prices have motivated vehicle manufacturers throughout the world to compete with respect to improvements in fuel efficiency. Particularly, in the case of engines, manufacturers have been pursuing efforts to reduce the weight and improve fuel efficiency of vehicles by, for example, reducing engine size.

As a result, research into reduction of weight and enhancement of fuel efficiency through downsizing has been conducted in the case of an engine and research for simultaneously securing operability and fuel efficiency competitiveness through multiple speed stages has been conducted in the case of an automatic transmission.

However, in the automatic transmission, as the number of speed stages increases, the number of internal components also increases. As a result, the automatic transmission may be difficult to mount, the manufacturing cost and weight may be increased, and power transmission efficiency may be deteriorated.

Accordingly, development of a planetary gear train that may bring about maximum efficiency with a small number of components may be important in order to increase fuel efficiency through the multiple speed stages.

In this aspect, in recent years, 8-speed automatic transmission has been implemented and the research and development of a planetary gear train capable of implementing more speed stages has also been actively conducted.

A conventional automatic transmission of eight or more speed stages typically includes three or four planetary gear sets and five to seven engaging elements (frictional elements). Thus, mountability may be deteriorated due to increase of volume and weight.

In this regard, disposing planetary gear sets in parallel or employing dog clutches instead of wet-type control elements is sometimes attempted. However, such an arrangement may not be widely applicable, and using the dog clutches may deteriorate shift-feel.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to provide a planetary gear train of an automatic transmission for a vehicle having advantages of improving power delivery performance and fuel economy by achieving nine forward speed stages with a minimum number of constituent elements, and improves driving by using a driving point positioned at a low engine speed.

A planetary gear train of an automatic transmission for a vehicle according to an exemplary embodiment of the present disclosure may include: an input shaft receiving torque of an engine; an output shaft transmitting torque to an output gear; a first planetary gear set including first, second, and third rotation elements; a compound planetary gear set including fourth, fifth, sixth, and seventh rotation elements by combining second and third planetary gear sets; a fourth planetary gear set including eighth, ninth, and tenth rotation elements; a first shaft fixedly connected to the ninth rotation element and the input shaft; a second shaft fixedly connected to the second rotation element and the sixth rotation element and fixedly connected to the output shaft; a third shaft fixedly connected to the first rotation element and the tenth rotation element; a fourth shaft fixedly connected to the fourth rotation element; a fifth shaft fixedly connected to the fifth rotation element; a sixth shaft fixedly connected to the seventh rotation element; and a plurality of shafts formed by combinations of remaining rotation elements of the first and fourth planetary gear sets that are not connected to the first to sixth shafts, and selectively and respectively connected to a transmission housing.

The plurality of shafts may include: a seventh shaft fixedly connected to the eighth rotation element and selectively connected to the transmission housing; and an eighth shaft fixedly connected to the third rotation element and selectively connected to the transmission housing. The first shaft and the fifth shaft, the fourth shaft and the eighth shaft, the fifth shaft and the seventh shaft, and the sixth shaft and the seventh shaft may be selectively and respectively connected to each other.

The planetary gear train may further include: four clutches, each selectively connecting any two shafts among the eight shafts; and two brakes, each selectively connecting each of the seventh shaft and the eighth shaft to the transmission housing.

The four clutches may include: a first clutch disposed between the first shaft and the fifth shaft; a second clutch disposed between the fourth shaft and the eighth shaft; a third clutch disposed between the fifth shaft and the seventh shaft; and a fourth clutch disposed between the sixth shaft and the seventh shaft. The two brakes may include: a first brake disposed between the seventh shaft and the transmission housing; and a second brake disposed between the eighth shaft and the transmission housing.

The first planetary gear set is a single pinion planetary gear set, the first rotation element is a first sun gear, the second rotation element is a first planet carrier, and the third rotation element is a first ring gear. The compound planetary gear set is formed by combining the second planetary gear set being a double pinion planetary gear set and the third planetary gear set being a single pinion planetary gear set, the fourth rotation element is a second sun gear, the fifth rotation element is a third sun gear, the sixth rotation element is a common planet carrier, and the seventh rotation element is a common ring gear. The fourth planetary gear set is a single pinion planetary gear set, the eighth rotation element is a fourth sun gear, the ninth rotation element is a fourth planet carrier, and the tenth rotation element is a fourth ring gear.

The first and fourth planetary gear sets and the compound planetary gear set may be disposed in a sequence of the fourth planetary gear set, the compound planetary gear set, and the first planetary gear set from an engine side.

The first planetary gear set may be disposed at an interior diameter portion of the compound planetary gear set.

The output gear may be disposed between the first planetary gear set and the compound planetary gear set.

The output gear may be disposed rearward to the first planetary gear set.

The planetary gear train according to the exemplary embodiment of the present disclosure may achieve at least nine forward speed stages and at least one reverse speed stage by combining one compound planetary gear set and two simple planetary gear sets with six engaging elements.

Since a speed stage suitable to an engine speed may be achieved due to multiple speed stages and a driving point positioned at a low engine speed may be used, silent driving may be improved.

In addition, engine driving efficiency may be maximized by achieving multiple speed stages, and power delivery performance and fuel efficiency may be improved.

DETAILED DESCRIPTION OF THE EMBODIMENTS

Hereinafter, an exemplary embodiment of the present disclosure will be described in detail with reference to accompanying drawings.

However, parts which are not related with the description are omitted for clearly describing the exemplary embodiment of the present disclosure and like reference numerals refer to like or similar elements throughout the specification.

In the following description, names of components are divided into first, second, and the like because the names of the components are the same as each other and an order thereof is not particularly limited.

Figure 1:
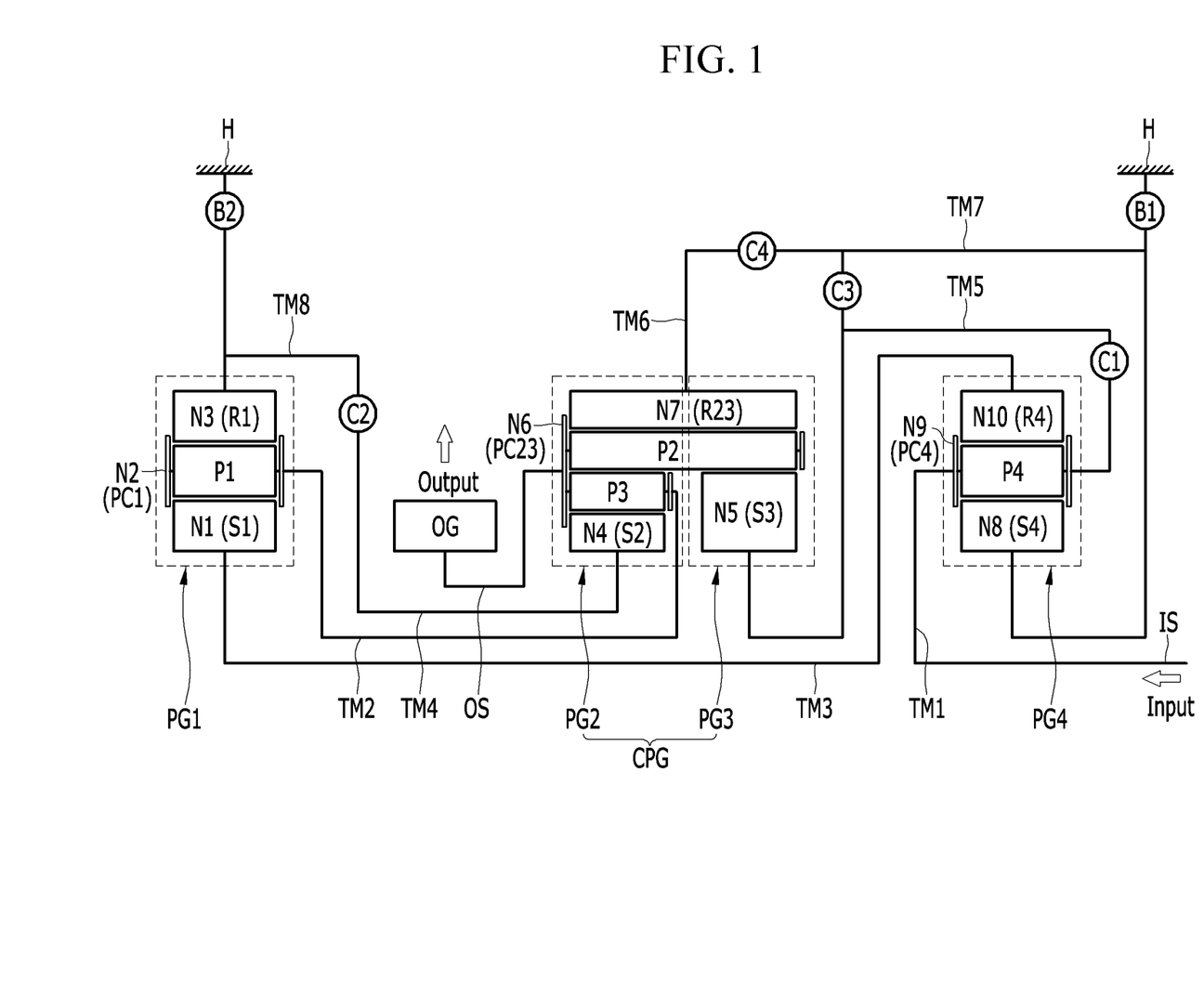
FIG. 1 is a schematic diagram of a planetary gear train according to the first exemplary embodiment of the present disclosure.

FIG. 1 is a schematic diagram of a planetary gear train according to the first exemplary embodiment of the present disclosure.

Referring to FIG. 1, a planetary gear train according to an exemplary embodiment of the present disclosure includes first, second, third, and fourth planetary gear sets PG1, PG2, PG3, and PG4 disposed on the same axis, an input shaft IS, an output shaft OS, eight shafts TM1 to TM8 connected to at least one of rotation elements of the first, second, third, and fourth planetary gear sets PG1, PG2, PG3, and PG4, six engaging elements including four clutches C1 to C4 and two brakes B1 and B2, and a transmission housing H.

Some of the rotation elements of the second and third planetary gear sets PG2 and PG3 are integrally formed or fixedly connected with each other to form one compound planetary gear set CPG.

Torque of an engine input from the input shaft IS is changed by cooperation of the first, second, third, and fourth planetary gear sets PG1, PG2, PG3, and PG4, and the changed torque is output through the output shaft OS.

According to the first exemplary embodiment of the present disclosure, the planetary gear sets are disposed in a sequence of the fourth planetary gear set PG4, the compound planetary gear set CPG including the second and third planetary gear sets PG2 and PG3, and the first planetary gear set PG1 from an engine side.

The input shaft IS is an input member and torque from a crankshaft of the engine is torque-converted through a torque converter (not shown) to be input to the input shaft IS.

The output shaft OS is an output member, is fixedly connected to an output gear OG, and transmits driving torque to a driving wheel (not shown) through a differential apparatus (not shown). The output gear OG is disposed between the first planetary gear set PG1 and the compound planetary gear set CPG.

The first planetary gear set PG1 is a single pinion planetary gear set and includes a first sun gear S1 as a first rotation element N1, a first planet carrier PC1 as a second rotation element N2 rotatably supporting a plurality of first pinion gears P1 externally meshed with the first sun gear S1, and a first ring gear R1 as a third rotation element N3 internally meshed with the plurality of first pinion gears P1 and operably connected with the first sun gear S1.

The compound planetary gear set CPG is formed by combining the second planetary gear set PG2, being a double pinion planetary gear set, and the third planetary gear set PG3, being a single pinion planetary gear set, such that the compound planetary gear set CPG is a planetary gear set of Ravingneaux type in which a ring gear and a planet carrier are shared in common.

Therefore, the compound planetary gear set CPG has four rotation elements including a ring gear, a planet carrier and two sun gears. The compound planetary gear set CPG includes a second sun gear S2 as a fourth rotation element N4 meshed with a plurality of short pinion gears P3, a third sun gear S3 as a fifth rotation element N5 meshed with a plurality of long pinion gears P2, a common planet carrier PC23 as a sixth rotation element N6 rotatably supporting the plurality of short pinion gears P3 externally meshed with the second sun gear S2 and the plurality of long pinion gears P2 externally meshed with the third sun gear S3, and a common ring gear R23 as a seventh rotation element N7 internally meshed with the plurality of long pinion gears P2 and operably connected to the second and third sun gears S2 and S3.

The fourth planetary gear set PG4 is a single pinion planetary gear set and includes a fourth sun gear S4 as an eighth rotation element N8, a fourth planet carrier PC4 as a ninth rotation element N9 rotatably supporting a plurality of fourth pinion gears P4 externally meshed with the fourth sun gear S4, and a fourth ring gear R4 as a tenth rotation element N10 internally meshed with the plurality of fourth pinion gears P4 and operably connected with the fourth sun gear S4.

Here, the term "operably connected" means at least two members are directly or indirectly connected with each other. However, two members that are operably connected with each other do not always rotate with the same rotational speed and in the same rotational direction.

The first rotation element N1 is fixedly connected to the tenth rotation element N10. The second rotation element N2 is fixedly connected to the sixth rotation element N6. The first and fourth planetary gear sets PG1 and PG4 and the compound planetary gear set CPG are operated with eight shafts TM1 to TM8.

The eight shafts TM1 to TM8 will be described in further detail.

The first shaft TM1 is fixedly connected to the ninth rotation element N9 (fourth planet carrier PC4) and is fixedly connected to the input shaft IS to be continuously operated as an input element.

The second shaft TM2 is fixedly connected to the second rotation element N2 (first planet carrier PC1) and the sixth rotation N6 (common planet carrier PC23) and is fixedly connected to the output shaft OS to be continuously operated as an output element.

The third shaft TM3 is fixedly connected to the first rotation element N1 (first sun gear S1) and the tenth rotation element N10 (fourth ring gear R4).

The fourth shaft TM4 is fixedly connected to the fourth rotation element N4 (second sun gear S2).

The fifth shaft TM5 is fixedly connected to the fifth rotation element N5 (third sun gear S3).

The sixth shaft TM6 is fixedly connected to the seventh rotation element N7 (common ring gear R23).

The seventh shaft TM7 is fixedly connected to the eighth rotation element N8 (fourth sun gear S4).

The eight shaft TM8 is fixedly connected to the third rotation element N3 (first ring gear R1).

Each of eight shafts TM1 to TM8 may fixedly connect at least one rotation element to another rotation element, may be a rotational member rotating with at least one rotation element, or may be a fixed member fixed to the transmission housing H.

Here, the term "fixedly connected" means at least two members are connected to each other to always rotate without rotational speed difference. That is, at least two members that are fixedly connected to each other always rotate with the same rotational speed and in the same rotational direction.

Here, the term "selectively connected" means a plurality of shafts including the input shaft and the output shaft are connectable to each other through at least one of the engaging elements to rotate with the same rotational speed and in the same rotational direction, or are connectable to the transmission housing through at least one of the engaging elements to be fixed to the transmission housing.

In other words, in a case that the engaging element selectively connects a plurality of shafts to each other, the plurality of shafts rotate with the same rotational speed and in the same rotational direction when the engaging element operates, but the plurality of shafts are disconnected from each other when the engaging element is released.

In addition, in a case that the engaging element selectively connects any one shaft to the transmission housing, the corresponding shaft is fixedly connected to the transmission housing when the engaging element operates, but the corresponding shaft is rotatable when the engaging element is released.

The first shaft TM1 is selectively connected to the fifth shaft TM5. The fourth shaft TM4 is selectively connected to the eighth shaft TM8. The seventh shaft TM7 is selectively connected to each of the fifth shaft TM5 and the sixth shaft TM6.

In addition, the seventh shaft TM7 and the eighth shaft TM8 are selectively connected to the transmission housing H to be operated as a selective fixed element.

Four clutches C1, C2, C3, and C4, which are engaging elements, are disposed at connection portions between any two shafts among shafts IS, OS, and TM1 to TM8.

In addition, two brakes B1 and B2, which are engaging elements, are disposed at a connection portion between any one shaft among the shafts TM1 to TM8 and the transmission housing H.

Arrangement of the four clutches C1 to C4 and two brakes B1 to B2 will be described in detail.

The first clutch C1 is disposed between the first shaft TM1 and the fifth shaft TM5 and selectively causes the first shaft TM1 and the fifth shaft TM5 to integrally rotate with each other.

The second clutch C2 is disposed between the fourth shaft TM4 and the eighth shaft TM8 and selectively causes the fourth shaft TM4 and the eighth shaft TM8 to integrally rotate with each other.

The third clutch C3 is disposed between the fifth shaft TM5 and the seventh shaft TM7 and selectively causes the fifth shaft TM5 and the seventh shaft TM7 to integrally rotate with each other.

The fourth clutch C4 is disposed between the sixth shaft TM6 and the seventh shaft TM7 and selectively causes the sixth shaft TM6 and the seventh shaft TM7 to integrally rotate with each other.

The first brake B1 is disposed between the seventh shaft TM7 and the transmission housing H and causes the seventh shaft TM7 to be operated as a selective fixed element.

The second brake B2 is disposed between the eighth shaft TM8 and the transmission housing H and causes the eighth shaft TM8 to be operated as a selective fixed element.

The engaging elements including the first, second, third, and fourth clutches C1, C2, C3, and C4 and the first and second brakes B1 and B2 may be multi-plate friction elements of a wet type that are operated by hydraulic pressure. Multi-plate friction elements of a wet type are mainly used as the engaging elements, but dog clutches, electric clutches, or magnetic clutches that can be operated by electric signal from an electric control unit can also be used as the engaging elements.

Figure 2:
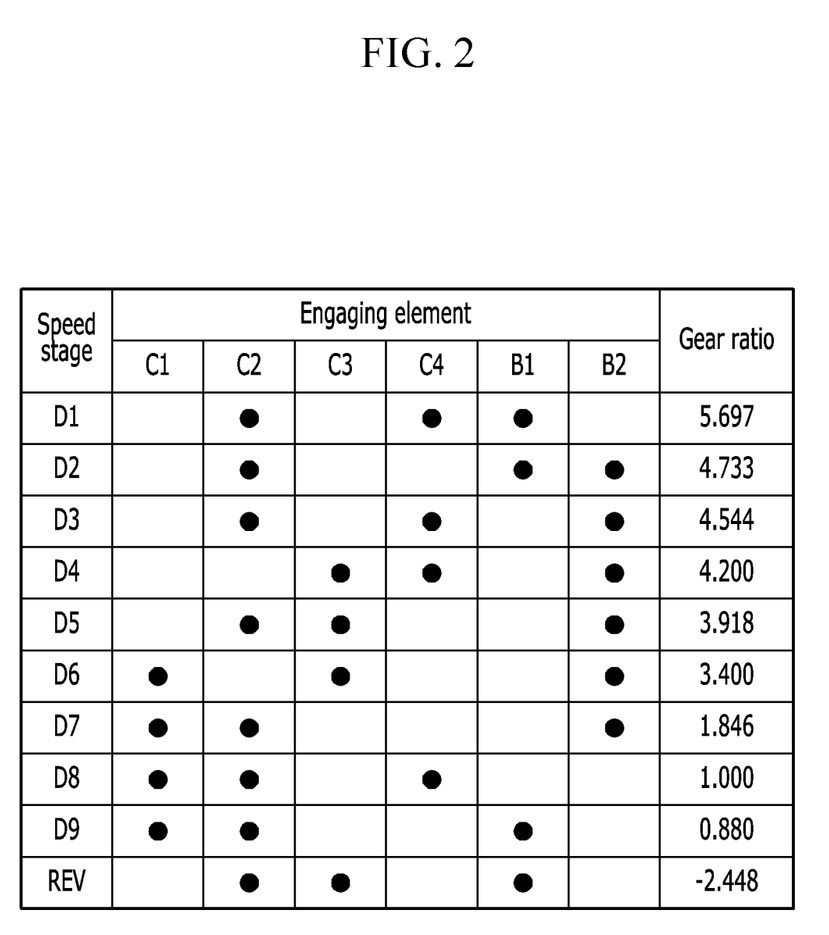
FIG. 2 is an operation chart of engaging elements at each speed stage in the planetary gear train according to the first exemplary embodiment of the present disclosure.

FIG. 2 is an operation chart of engaging elements at each speed stage in the planetary gear train according to the first exemplary embodiment of the present disclosure.

Referring to FIG. 2, three engaging elements among the first, second, third, and fourth clutches C1, C2, C3, and C4 and the first and second brakes B1 and B2 are operated at each speed stage in the planetary gear train according to the first exemplary embodiment of the present disclosure. Shifting processes in the first exemplary embodiment of the present disclosure will be described in further detail.

The second and fourth clutches C2 and C4 and the first brake B1 are operated at a first forward speed stage D1.

In that state where the fourth shaft TM4 is connected to the eighth shaft TM8 by operation of the second clutch C2 and the sixth shaft TM6 is connected to the seventh shaft TM7 by operation of the fourth clutch C4, torque of the input shaft IS is input to the first shaft TM1.

In addition, the seventh shaft TM7 is operated as the fixed element by operation of the first brake B1. Therefore, the first forward speed stage D1 is achieved and torque of the input shaft IS is output through the output shaft OS connected to the second shaft TM2.

The second clutch C2 and the first and second brakes B1 and B2 are operated at a second forward speed stage D2.

In that state where the fourth shaft TM4 is connected to the eighth shaft TM8 by operation of the second clutch C2, torque of the input shaft IS is input to the first shaft TM1.

In addition, the seventh shaft TM7 and the eighth shaft TM8 is operated as the fixed element by operation of the first and second brakes B1 and B2. Therefore, the second forward speed stage D2 is achieved and torque of the input shaft IS is output through the output shaft OS connected to the second shaft TM2.

The second and fourth clutches C2 and C4 and the second brake B2 are operated at a third forward speed stage D3.

In that state where the fourth shaft TM4 is connected to the eighth shaft TM8 by operation of the second clutch C2 and the sixth shaft TM6 is connected to the seventh shaft TM7 by operation of the fourth clutch C4, torque of the input shaft IS is input to the first shaft TM1.

In addition, the eighth shaft TM8 is operated as the fixed element by operation of the second brake B2. Therefore, the third forward speed stage D3 is achieved and torque of the input shaft IS is output through the output shaft OS connected to the second shaft TM2.

The third and fourth clutches C3 and C4 and the second brake B2 are operated at a fourth forward speed stage D4.

In that state where the fifth shaft TM5 is connected to the seventh shaft TM7 by operation of third clutch C3 and the sixth shaft TM6 is connected to the seventh shaft TM7 by operation of the fourth clutch C4, torque of the input shaft IS is input to the first shaft TM1.

In addition, the eighth shaft TM8 is operated as the fixed element by operation of the second brake B2. Therefore, the fourth forward speed stage D4 is achieved and torque of the input shaft IS is output through the output shaft OS connected to the second shaft TM2.

The second and third clutches C2 and C3 and second brake B2 are operated at a fifth forward speed stage D5.

In that state where the fourth shaft TM4 is connected to the eighth shaft TM8 by operation of the second clutch C2 and the fifth shaft TM5 is connected to the seventh shaft TM7 by operation of third clutch C3, torque of the input shaft IS is input to the first shaft TM1.

In addition, the eighth shaft TM8 is operated as the fixed element by operation of the second brake B2. Therefore, the fifth forward speed stage D5 is achieved and torque of the input shaft IS is output through the output shaft OS connected to the second shaft TM2.

The first and third clutches C1 and C3 and the second brake B2 are operated at a sixth forward speed stage D6.

In that state where the first shaft TM1 is connected to the fifth shaft TM5 by operation of the first clutch C1 and the fifth shaft TM5 is connected to the seventh shaft TM7 by operation of third clutch C3, torque of the input shaft IS is input to the first shaft TM1.

In addition, the eighth shaft TM8 is operated as the fixed element by operation of the second brake B2. Therefore, the sixth forward speed stage D6 is achieved and torque of the input shaft IS is output through the output shaft OS connected to the second shaft TM2.

The first and second clutches C1 and C2 and the second brake B2 are operated at a seventh forward speed stage D7.

In that state where the first shaft TM1 is connected to the fifth shaft TM5 by operation of the first clutch C1 and the fourth shaft TM4 is connected to the eighth shaft TM8 by operation of the second clutch C2, torque of the input shaft IS is input to the first shaft TM1.

In addition, the eighth shaft TM8 is operated as the fixed element by operation of the second brake B2. Therefore, the seventh forward speed stage D7 is achieved and torque of the input shaft IS is output through the output shaft OS connected to the second shaft TM2.

The first, second, and fourth clutches C1, C2, and C4 are operated at an eighth forward speed stage D8.

In that state where the first shaft TM1 is connected to the fifth shaft TM5 by operation of the first clutch C1, the fourth shaft TM4 is connected to the eighth shaft TM8 by operation of the second clutch C2, and the sixth shaft TM6 is connected to the seventh shaft TM7 by operation of the fourth clutch C4, torque of the input shaft IS is input to the first shaft TM1.

In this case, the first and fourth planetary gear sets PG1 and PG4 and the compound planetary gear set CPG integrally rotate. Therefore, the eighth forward speed stage D8 is achieved. At the eighth forward speed stage, the rotational of [please add structure] speed is the same as that of the input shaft IS.

The first and second clutches C1 and C2 and the first brake B1 are operated at a ninth forward speed stage D9.

In that state where the first shaft TM1 is connected to the fifth shaft TM5 by operation of the first clutch C1 and the fourth shaft TM4 is connected to the eighth shaft TM8 by operation of the second clutch C2, torque of the input shaft IS is input to the first shaft TM1.

In addition, the seventh shaft TM7 is operated as the fixed element by operation of the first brake B1. Therefore, the ninth forward speed stage D9 is achieved and torque of the input shaft IS is output through the output shaft OS connected to the second shaft TM2.

The second and third clutches C2 and C3 and the first brake B1 are operated at a reverse speed stage REV.

In that state where the fourth shaft TM4 is connected to the eighth shaft TM8 by operation of the second clutch C2 and the fifth shaft TM5 is connected to the seventh shaft TM7 by operation of third clutch C3, torque of the input shaft IS is input to the first shaft TM1.

In addition, the seventh shaft TM7 is operated as the fixed element by operation of the first brake B1. Therefore, the reverse speed stage REV is achieved and torque of the input shaft IS is output through the output shaft OS connected to the second shaft TM2.

Figure 3:
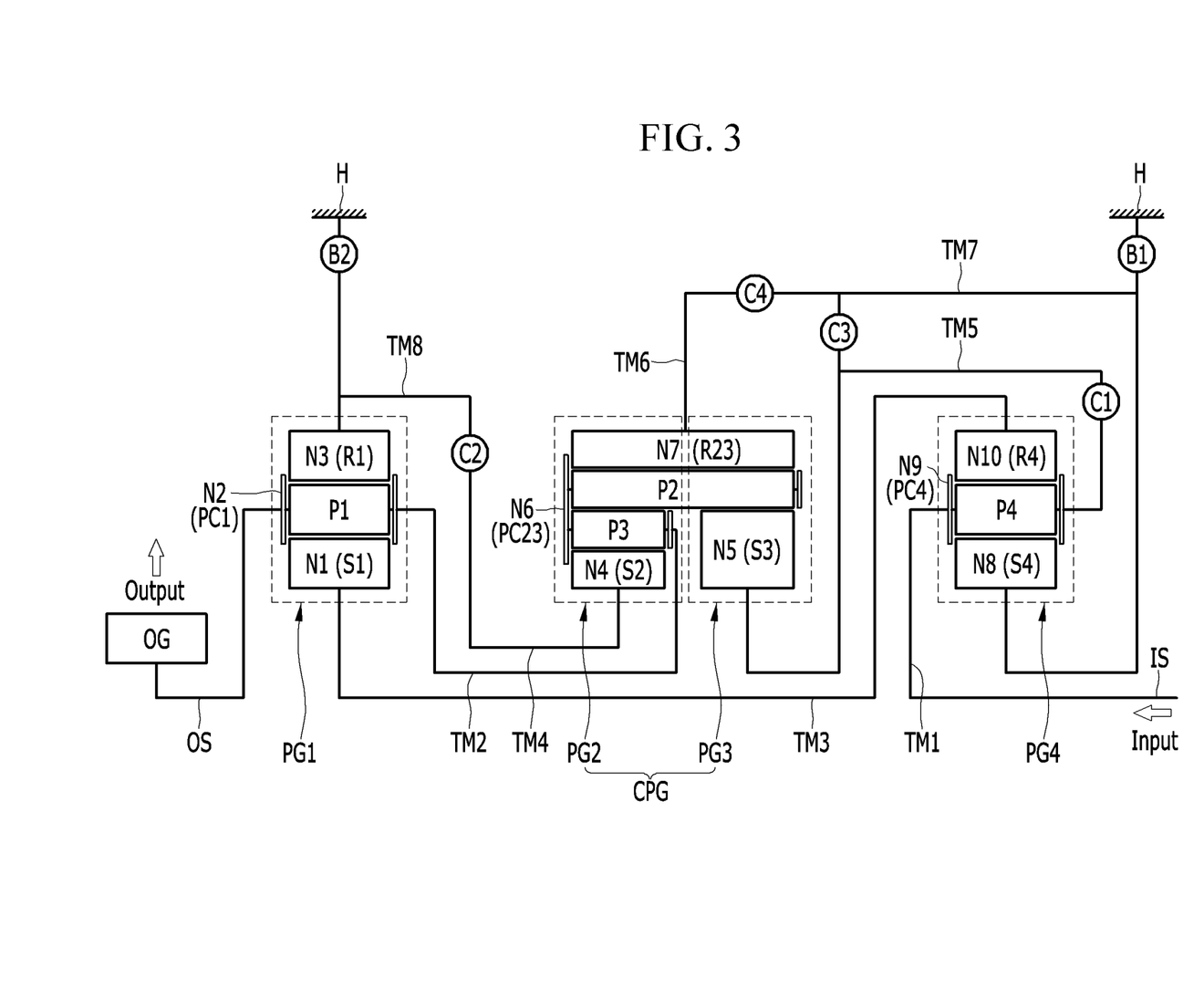
FIG. 3 is a schematic diagram of a planetary gear train according to the third exemplary embodiment of the present disclosure.

FIG. 3 is a schematic diagram of a planetary gear train according to the second exemplary embodiment of the present disclosure.

Referring to FIG. 3, according to the second exemplary embodiment of the present disclosure, the connections of all the rotation elements is the same as that of the planetary gear train according to the first exemplary embodiment of the present disclosure, with the exception that the output gear OG is disposed rearward to the first planetary gear set PG1.

In other words, the second exemplary embodiment of the present disclosure, compared with the first exemplary embodiment, has the output gear OG in a different position, but other components and shifting processes of the second exemplary embodiment are the same as those of the first exemplary embodiment. Therefore, a detailed description thereof will be omitted.

Figure 4:
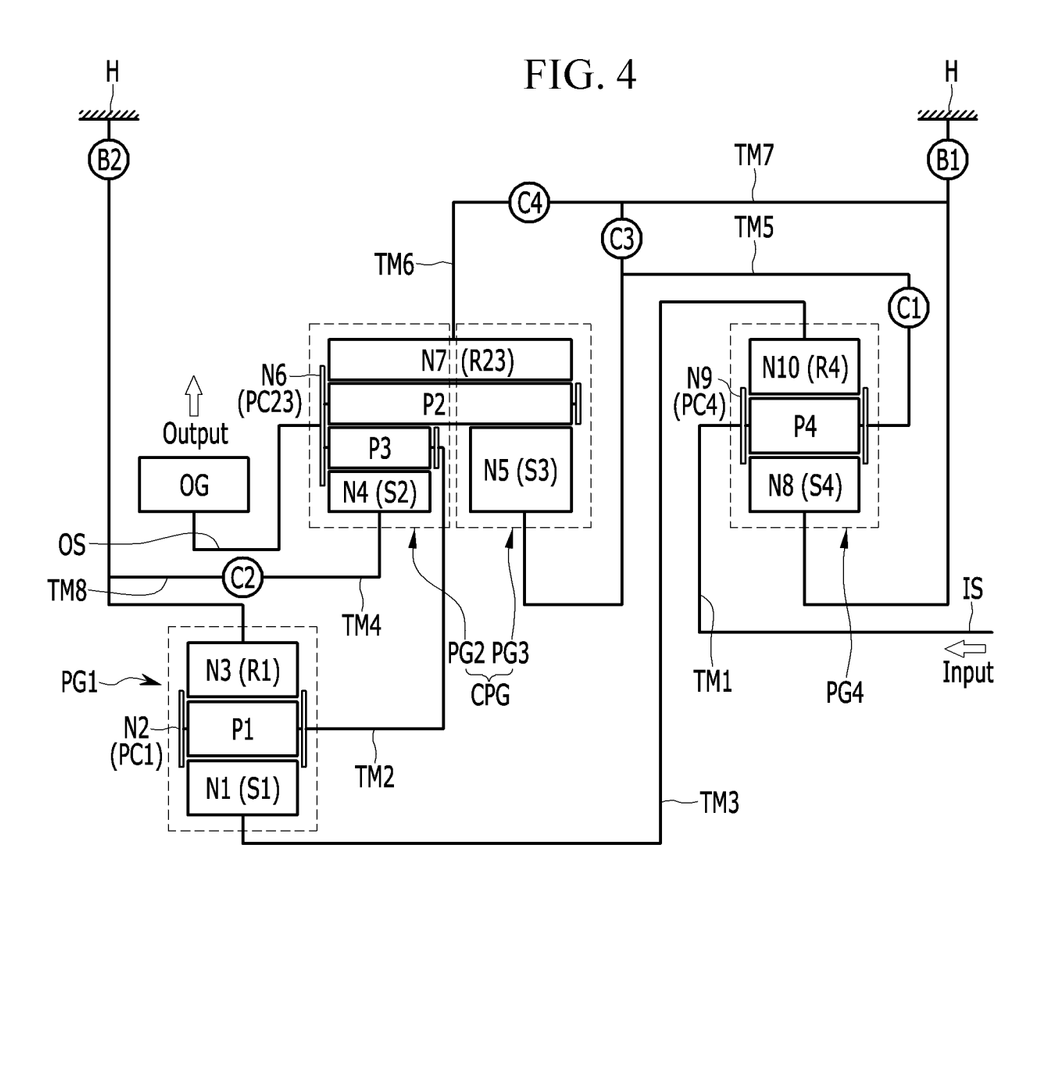
FIG. 4 is a schematic diagram of a planetary gear train according to the fourth exemplary embodiment of the present disclosure.

FIG. 4 is a schematic diagram of a planetary gear train according to the third exemplary embodiment of the present disclosure.

According to the first exemplary embodiment of the present disclosure, the planetary gear sets PG1, CPG, and PG4 are disposed on the same axis. However, in a planetary gear train according to the third exemplary embodiment, the first planetary gear set PG1 is disposed at an interior diameter portion of the compound planetary gear set CPG as shown in FIG. 4.

In other words, the third exemplary embodiment of the present disclosure, compared with the first exemplary embodiment, has the first planetary gear set PG1 in a different position, but other components and shifting processes of the second exemplary embodiment are the same as those of the first exemplary embodiment. Therefore, a detailed description thereof will be omitted.

The planetary gear train according to the exemplary embodiment of the present disclosure may achieve at least nine forward speed stages and at least one reverse speed stage by control of the four planetary gear sets PG1, PG2, PG3, and PG4, four clutches C1, C2, C3, and C4, and two brakes B1 and B2.

Since a speed stage suitable to an engine speed may be achieved due to multiple speed stages and a driving point positioned at a low engine speed may be used, silent driving may be improved.

In addition, engine driving efficiency may be maximized by achieving multiple speed stages, and power delivery performance and fuel efficiency may be improved.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A planetary gear train of an automatic transmission for a vehicle, comprising:
   an input shaft receiving torque of an engine;
   an output shaft transmitting torque to an output gear;
   a first planetary gear set including first, second, and third rotation elements;
   a compound planetary gear set including fourth, fifth, sixth, and seventh rotation elements by combining second and third planetary gear sets;
   a fourth planetary gear set including eighth, ninth, and tenth rotation elements;
   a first shaft fixedly connected to the ninth rotation element and the input shaft;
   a second shaft fixedly connected to the second rotation element and the sixth rotation element and fixedly connected to the output shaft;
   a third shaft fixedly connected to the first rotation element and the tenth rotation element;
   a fourth shaft fixedly connected to the fourth rotation element;
   a fifth shaft fixedly connected to the fifth rotation element;
   a sixth shaft fixedly connected to the seventh rotation element; and
   a plurality of shafts cooperating with combinations of remaining rotation elements of the first and fourth planetary gear sets that are not connected to the first to sixth shafts, and selectively connected to a transmission housing.

2. The planetary gear train of claim 1, wherein the plurality of shafts comprise:
   a seventh shaft fixedly connected to the eighth rotation element and selectively connected to the transmission housing; and
   an eighth shaft fixedly connected to the third rotation element and selectively connected to the transmission housing,
   wherein the first shaft and the fifth shaft, the fourth shaft and the eighth shaft, the fifth shaft and the seventh shaft, and the sixth shaft and the seventh shaft are selectively and respectively connected to each other.

3. The planetary gear train of claim 2, further comprising:
   four clutches, each selectively connecting any two shafts among the eight shafts; and
   two brakes, each selectively connecting each of the seventh shaft and the eighth shaft to the transmission housing.

4. The planetary gear train of claim 3, wherein:
   the four clutches comprise:
   a first clutch disposed between the first shaft and the fifth shaft;
   a second clutch disposed between the fourth shaft and the eighth shaft;
   a third clutch disposed between the fifth shaft and the seventh shaft; and
   a fourth clutch disposed between the sixth shaft and the seventh shaft, and
   the two brakes comprise:
   a first brake disposed between the seventh shaft and the transmission housing; and
   a second brake disposed between the eighth shaft and the transmission housing.

5. The planetary gear train of claim 1, wherein the first planetary gear set is a single pinion planetary gear set, the first rotation element is a first sun gear, the second rotation element is a first planet carrier, and the third rotation element is a first ring gear,
   the compound planetary gear set is formed by combining the second planetary gear set being a double pinion planetary gear set and the third planetary gear set being a single pinion planetary gear set, the fourth rotation element is a second sun gear, the fifth rotation element is a third sun gear, the sixth rotation element is a common planet carrier, and the seventh rotation element is a common ring gear, and
   the fourth planetary gear set is a single pinion planetary gear set, the eighth rotation element is a fourth sun gear, the ninth rotation element is a fourth planet carrier, and the tenth rotation element is a fourth ring gear.

6. The planetary gear train of claim 1, wherein the first and fourth planetary gear sets and the compound planetary gear set are disposed in a sequence of the fourth planetary gear set, the compound planetary gear set, and the first planetary gear set from an engine side.

7. The planetary gear train of claim 1, wherein the first planetary gear set is disposed at an interior diameter portion of the compound planetary gear set.

8. The planetary gear train of claim 1, wherein the output gear is disposed between the first planetary gear set and the compound planetary gear set.

9. The planetary gear train of claim 1, wherein the output gear is disposed rearward to the first planetary gear set.

10. A planetary gear train of an automatic transmission for a vehicle, comprising:
    an input shaft receiving torque of an engine;
    an output shaft transmitting torque to an output gear;
    a first planetary gear set including first, second, and third rotation elements;
    a compound planetary gear set including fourth, fifth, sixth, and seventh rotation elements by combining second and third planetary gear sets; and
    a fourth planetary gear set including eighth, ninth, and tenth rotation elements,
    wherein the first rotation element is fixedly connected to the tenth rotation element, the second rotation element is fixedly connected to the sixth rotation element and the output shaft, the third rotation element is selectively connected to the fourth rotation element and is selectively connected to a transmission housing, the fifth rotation element is selectively connected to the eighth rotation element and is selectively connected to the ninth rotation element, the seventh rotation element is selectively connected to the eighth rotation element, the eighth rotation element is selectively connected to the transmission housing, and the ninth rotation element is fixedly connected to the input shaft.

11. The planetary gear train of claim 10, further comprising:

four clutches, each selectively connecting one rotation element to another rotation element; and two brakes, each selectively connecting each of the third rotation element and the eighth rotation element to the transmission housing.

12. The planetary gear train of claim 11, wherein:

the four clutches comprise:

a first clutch disposed between the fifth rotation element and the ninth rotation element;

a second clutch disposed between the third rotation element and the fourth rotation element;

a third clutch disposed between the fifth rotation element and the eighth rotation element; and a fourth clutch disposed between the seventh rotation element and the eighth rotation element, and the two brakes comprise:

a first brake disposed between the eighth rotation element and the transmission housing; and a second brake disposed between the third rotation element and the transmission housing.

13. The planetary gear train of claim 10, wherein the first planetary gear set is a single pinion planetary gear set, the first rotation element is a first sun gear, the second rotation element is a first planet carrier, and the third rotation element is a first ring gear, the compound planetary gear set is formed by combining the second planetary gear set being a double pinion planetary gear set and the third planetary gear set being a single pinion planetary gear set, the fourth rotation element is a second sun gear, the fifth rotation element is a third sun gear, the sixth rotation element is a common planet carrier, and the seventh rotation element is a common ring gear, and the fourth planetary gear set is a single pinion planetary gear set, the eighth rotation element is a fourth sun gear, the ninth rotation element is a fourth planet carrier, and the tenth rotation element is a fourth ring gear.

14. The planetary gear train of claim 10, wherein the first and fourth planetary gear sets and the compound planetary gear set are disposed in a sequence of the fourth planetary gear set, the compound planetary gear set, and the first planetary gear set from an engine side.

15. The planetary gear train of claim 10, wherein the first planetary gear set is disposed at an interior diameter portion of the compound planetary gear set.

16. The planetary gear train of claim 10, wherein the output gear is disposed between the first planetary gear set and the compound planetary gear set.

17. The planetary gear train of claim 10, wherein the output gear is disposed rearward to the first planetary gear set.

* * * * *